United States Patent [19]
Gibson

[11] 4,173,011
[45] Oct. 30, 1979

[54] LOW TIRE PRESSURE WARNING SYSTEM

[76] Inventor: Charles R. Gibson, P.O. Box 137, Lakeside, Calif. 92040

[21] Appl. No.: 874,378

[22] Filed: Feb. 2, 1978

[51] Int. Cl.² ............................................... B60C 23/00
[52] U.S. Cl. .................................... 340/58; 200/61.22
[58] Field of Search ...................... 340/58; 200/61.22; 280/676

[56] References Cited
U.S. PATENT DOCUMENTS
2,499,669  3/1950  Murat ...................................... 340/58

Primary Examiner—Alvin H. Waring
Attorney, Agent, or Firm—Charles C. Logan, II

[57] ABSTRACT

A low tire pressure warning system for a trailer having a frame for supporting the body of the trailer, having tandem axles equipped with normally inflated pneumatic tires, leaf spring suspension structure for the axles including a walking beam that is pivoted on the frame for tilting movement in opposite directions from a normal position in accordance with the deflation of a tire of either one of the axles, a signal member for indicating that one of the tires doesn't have enough air, a signal operating switch in circuit with the signal member, and mechanical actuating structure for the signal operating switch.

7 Claims, 4 Drawing Figures

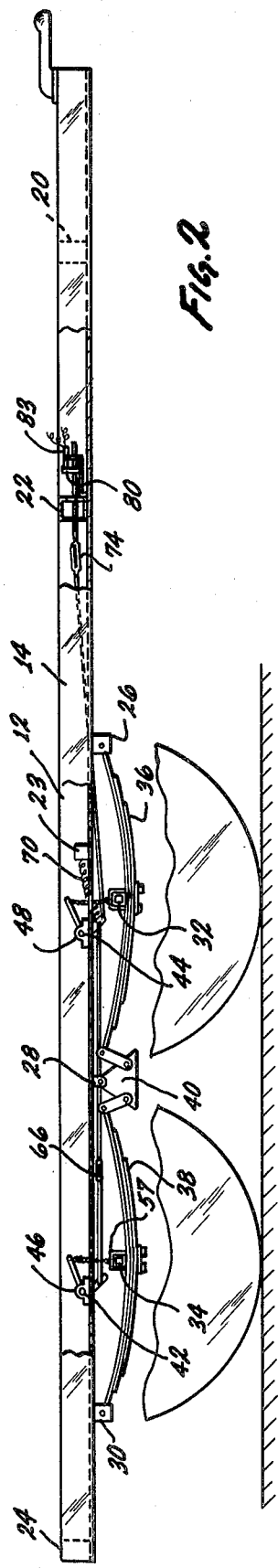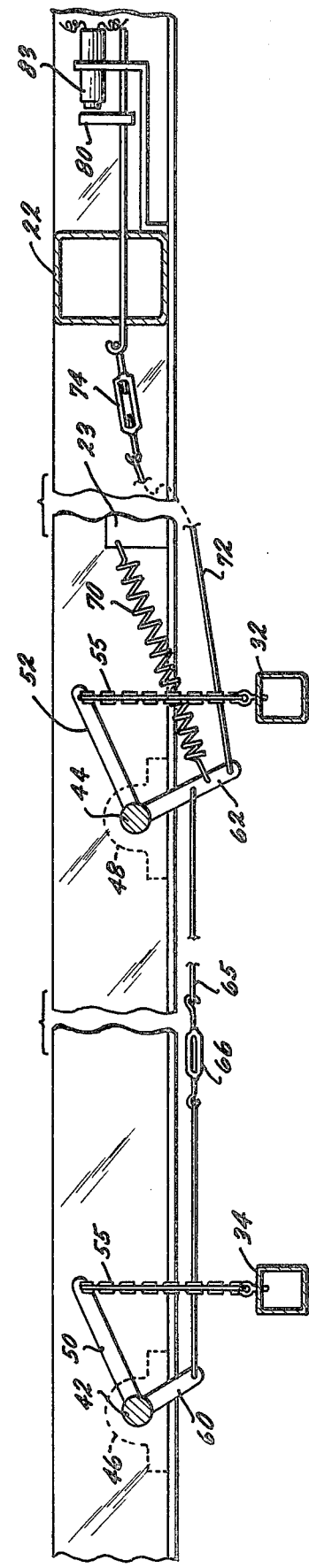

LOW TIRE PRESSURE WARNING SYSTEM

BACKGROUND OF THE INVENTION

The invention relates to a low tire pressure warning system and more particularly, for a system designed primarily for the purpose of warning the driver of a trailer towing vehicle that one of the tires of the tandem axle trailer is going flat or is insufficiently inflated.

One of the nuances of towing a tandem axle trailer is that it is very difficult to detect the loss of air in one of the trailer tires before the tire has been ruined. In many instances, the driver is not alerted in time to stop the towing vehicle before the tire casing has been chewed up and in some instances, portions of the tire casing are ripped free and may do damage to electrical wiring running beneath the frame of the trailer.

Attempts have been made in the past to design a signaling system to warn the driver of the trailer towing vehicle that there is insufficient air in one of the tires. One such system is described in U.S. Pat. No. 2,957,058. This system requires a special walking beam structure with oscillating shackles to be installed on the trailer and attachment to the leaf spring. The system of this patent has never become popular presumably due to the need for modification of the existing suspension system of the trailer before it can be installed on the trailer.

A latter attempt to devise another type of low tire pressure warning system was disclosed in U.S. Pat. No. 3,614,122. This system also has the same drawback as the previously described system, in that the existing suspension of the trailer must be modified with a specially configured walking beam.

It is an object of the invention to provide a signal to the driver of the towing vehicle when one of the tires starts to become deflated or the air pressure in one of the tires is not sufficient to properly support the load carried.

It is also an object of the invention to provide a low tire pressure warning system constructed in a manner whereby it may be utilized on substantially all tandem axle trailers.

It is a further object of the invention to provide a warning system, including an adjustment feature thereof that will enable the warning system to be adjusted to operate at different predetermined losses of air pressure in any of the tires.

It is an additional object of the invention to provide a low tire pressure warning system that can be installed on substantially all tandem axle trailers without the necessity of modifying or changing any of the suspension structure of the trailer.

It is a final object of the invention to provide a vehicle low tire pressure warning system that is economical to manufacture, install, longlasting and relatively trouble-free.

SUMMARY OF THE INVENTION

The novel low tire pressure warning system for a trailer having tandem axles can be installed on the trailer without the necessity of modifying or changing any of the trailer suspension. The system has a pair of actuator rods extending laterally across the width of the frame with their opposite ends journaled in bearings that are attached to the sides of the frame. Adjacent the opposite ends of each of the actuator rods are arms that extend radially outwardly from the actuator rods and toward the front end of the trailer with the forward end of these arms normally being positioned vertically above the respective axles. A short length of twisted length chain is normally stretched taut between the end of the arms and the axle with the chain being secured to these members. Each of the actuator rods also has a center arm that extends radially outwardly from a position near the midpoint of its length and this arm extends slightly downwardly and toward the front end of the trailer. The forwardmost center arm has three apertures in it. A cable is attached to one of these apertures at its one end and it has a turn buckle attached at its other end which in turn is attached to the rear center arm. The middle aperture of the front center arm has one end of a tension spring attached to it with the other end of the tension spring attached to a cross beam of the frame. The third aperture of the front center arm is connected to one end of another cable that has its other end attached to the signal operating switch. The signal operating switch is part of a circuit that is normally open at the plunger of the switch itself. The plunger extends rearwardly and as long as it is maintained in a depressed state by a disc that is spring loaded against it, the light or alarm on the dash of the towing vehicle will not be actuated.

In operation, when any of the tires of the trailer begin to lose air, this will cause that wheel to automatically pull on the chain attached to the end of that axle causing the end arm extending forwardly from the actuator rod to pivot downwardly about its axis. Simultaneously the center arm of the actuator rod is also pivoting clockwise and rearwardly, causing the disc that has been spring loaded against the plunger of the signal operating switch to move out of contact with the plunger thereby closing the electrical circuit to the warning light or audible signal device. The plunger of the signal operating switch is adjusted longitudinally so that the sensitivity of the system can be adjusted to operate when any of the tires loses only a couple of pounds or to where any of the tires loses, for example, up tp ten pounds. The system is designed to provide an early warning signal so that the driver of the towing vehicle may stop it and the trailer before the tire that is losing air pressure is ruined.

DESCRIPTION OF THE DRAWINGS

FIG. 2 is a partial side elevation view of the trailer frame and its suspension structure, FIG. 3 is an enlarged side elevation view of the mechanical structure of the low tire pressure warning system illustrating how the signal operating switch is actuated.

DESCRIPTION OF THE PREFERRED EMBODIMENT

Figure 1:
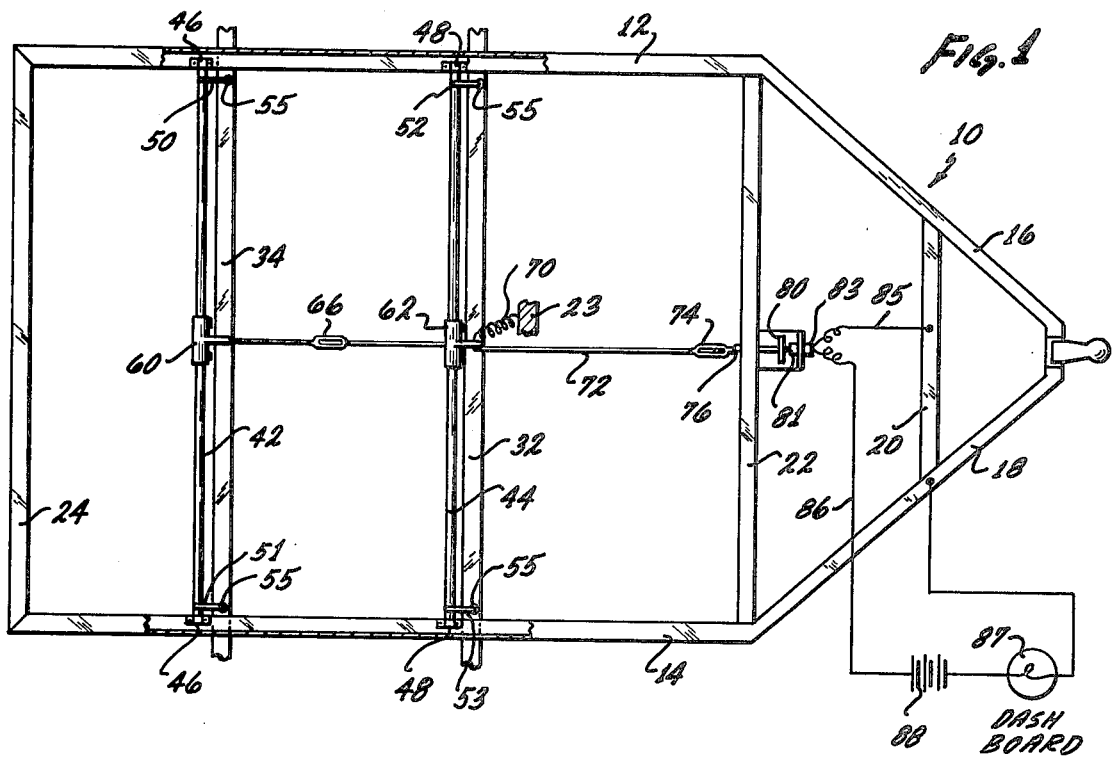
FIG. 1 is a top plan view of the trailer frame, illustrating the electrical circuit schematically.
Figure 4:
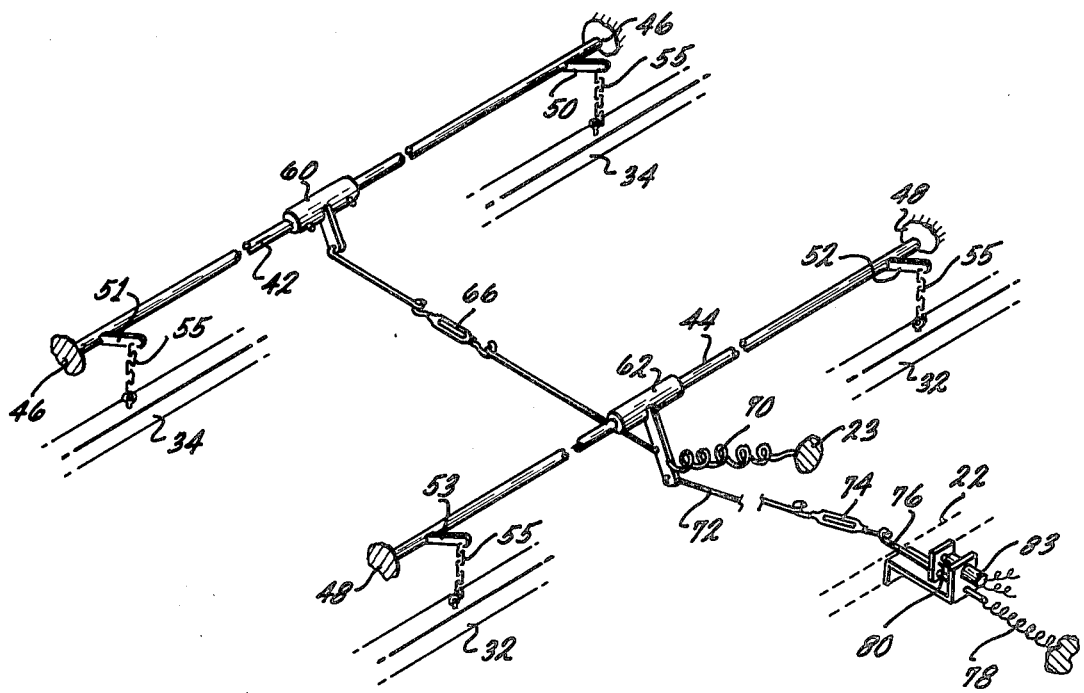
FIG. 4 is a perspective view of the mechanical structure of the low tire pressure warning system.

The trailer structure to which the novel low tire pressure warning system is attached is best illustrated in FIGS. 1-4. The frame of the trailer is generally designated numeral 10 and it has longitudinal side beams 12 and 14, front beams, 16 and 18, and cross lateral beams, 20, 22, 23 and 24. The frame also includes a pair of front hanger brackets 26, a pair of middle hanger brackets, 28, and a pair of rear hanger brackets 30. The frame is supported on tandem axles, 32 and 34, by leaf springs, 36 and 38. Leaf spring 36 have their forward ends pivotally hinged to front hanger brackets 26 and their rear ends pivotally hinged to walking beams 40 that are in turn pivotally hinged to middle hanger brackets 28. Leaf springs 34 have their front ends pivotally hinged to walking beams 40 and their rear end pivotally hinged to rear hanging brackets 30.

The mechanical structure of the novel low tire pressure warning system that is added to the basic trailer frame and its suspension is best described by viewing FIGS. 1 and 3. A pair of actuator rods 42 and 44 have their opposite end journaled in pillow block bearings 46 and 48. The pillow block bearings are bolted or otherwise secured to the side beam members 12 and 14 of the trailer frame. Actuator rod 42 has a pair of arms 50 and 51 located adjacent to the opposite ends of the actuator rod and these extend radially outwardly from the actuator rod toward the front end of the trailer with the forward end of the arms normally being positioned vertically above axle 34. Actuator rod 44 has a pair of arms 52 and 53 located adjacent to its opposite ends and these also extend radially outwardly from the rods and toward the front end of the trailer with their forward end normally being positioned vertically above axle 44. A short length of twisted link chain 55 is normally stretched taut between the end of the arms and the respective axles. The lower end of each short length of chain is attached to a C-clamp 57 attached to the respective axes.

Actuator rod 42 and 44 also have center arm members 60 and 62 respectively that extends radially outwardly from a position near the midpoint the length of the rod. The center arms extend slightly downwardly and toward the front end of the trailer. Center arm 60 has an aperture in its end and center arm 62 has three apertures based along its length. A cable 65 has its one end secured to one of the apertures in center arm 62 and its opposite end secured to a turn buckle 66 whose opposite end is in turn secured in the aperture at the end of center arm 60. A tension spring 70 keeps the center arms normally forwardly oriented and the tension spring has its rearward end secured to one of the apertures in center arm 62 and its forward end secured to cross beam 23. The remaining aperture of center arm 62 has one end of cable 72 secured thereto and the opposite end of this cable is secured to turn buckle 74. Cable 74 is in turn attached to one end of cable 76. The other end of cable 76 has a tension spring attached to it whose forward end is secured to cross beam 20 of the frame. A disc 80 is fixedly secured on cable 76 at a position that normally keeps it in contact with plunger 81 of the signal operating switch 83. As long as plunger 81 is kept in a depressed state, the electrical circuit through wires 85 and 86, lamp 87, and battery 88, remains open. The circuit becomes closed when the air pressure in any of the four tires becomes too low or begins to escape, thus causing that end of the axle to drop downwardly causing its respective actuator rod to pivot clockwise causing the cable 72 to pull disc 80 out of contact with plunger 81. As mentioned previously, the length that plunger 81 extends outwardly from the switch can be adjusted to vary the sensitivity of the system as to how many pounds of pressure loss in any of the tires will actuate the signal.

A toggle switch can also be inserted into the circuit for deactivating the circuit when driving in a campground or trailer parking area having rough terrain.

What is claimed is:

1. A low tire pressure warning system for a trailer having tandem axles comprising:

a frame for supporting the body of a trailer, tandem axles equipped with normally inflated pneumatic tires, suspension means for said axles including a walking beam that is pivoted on the frame for tilting movement in opposite directions from a normal position in accordance with the deflation of a tire of either one of said axles, signal means for indicating that one of said tires doesn't have enough air, a signal operating switch in circuit with said signal means, actuating means for said signal operating switch comprising a plurality of actuator rods that extend laterally with respect to the longitudinal axis of said frame, said actuator rods extend across the width of said frame and have their ends journaled in bearings, each of said actuator rods being associated with one of the axles, said actuator rods being mounted to said frame so that they may pivot about their longitudinal axis, first means on said actuator rods connected to said axles whereby said actuator rods pivot a predetermined arc in response to the axle dropping downwardly due to loss of air pressure in the tire, second means on said actuator rods connected to said signal operating switch whereby when said actuator rods pivot a predetermined arc in response to the axle dropping downwardly the switch will close completing the circuit and operate the signal means, and said first means on said actuator rode comprises a pair of arms located adjacent the opposite ends of said actuator rods that extend radially outward from the actuator rods and toward the front end of the trailer with the forward end of said arms normally being positioned vertically above the respective axles, a link chain is normally stretched taut between the end of said arms and said axle with its respective ends secured to said members.

2. A low tire pressure warning system as recited in claim 1 wherein said signal means comprises a lamp bulb.

3. A low tire pressure warning system as recited in claim 1 wherein said signal operating switch has structure that is adjustable for varying the tire pressure at which the system is activated.

4. A low tire pressure warning system as recited in claim 1 wherein said second means on said actuator rods is a center arm that extends radially outward from a position near the mid-point of the length of the rod, said center arm extending slightly downwardly and toward the front end of the trailer.

5. A low tire pressure warning system as recited in claim 4 wherein a first cable attached to a turnbuckle is connected between the respective downwardly and forwardly extending center arms of the respective actuator rods with turnbuckle being adjustable to maintain the cable taut.

6. A low tire pressure warning system as recited in claim 5 further comprising a tension spring having one end attached to the forwardmost actuator rod's center arm and its other end attached to a cross beam of said frame located forwardly of said actuator rod whereby said center arm is normally restrained in its forwardmost position.

7. A low tire pressure warning system as recited in claim 5 further comprising a second cable attached to another turnbuckle and they are connected between said forwardmost center arm and said signal operating switch.

* * * * *